United States Patent
Shrivastava

(10) Patent No.: US 10,956,516 B2
(45) Date of Patent: Mar. 23, 2021

(54) COLLECTIVELY PERFORMING DOMAIN SEARCHES AND TRADEMARK SEARCHES

(71) Applicant: Oath Inc., New York, NY (US)

(72) Inventor: Kushagra Shrivastava, San Jose, CA (US)

(73) Assignee: Verizon Media Inc., New York, NY (US)

( * ) Notice: Subject to any disclaimer, the term of this patent is extended or adjusted under 35 U.S.C. 154(b) by 212 days.

(21) Appl. No.: 16/011,731

(22) Filed: Jun. 19, 2018

(65) Prior Publication Data

US 2019/0384859 A1 Dec. 19, 2019

(51) Int. Cl.
| | |
|---|---|
| *G06F 16/00* | (2019.01) |
| *G06F 16/951* | (2019.01) |
| *G06F 3/0484* | (2013.01) |
| *G06F 16/338* | (2019.01) |

(52) U.S. Cl.
CPC .......... *G06F 16/951* (2019.01); *G06F 3/0484* (2013.01); *G06F 16/338* (2019.01)

(58) Field of Classification Search
CPC .... G06F 16/951; G06F 16/338; G06F 3/0484; G06F 16/33
See application file for complete search history.

(56) References Cited

U.S. PATENT DOCUMENTS

| | | | | |
|---|---|---|---|---|
| 7,743,093 B2* | 6/2010 | Damour | ................. | G06Q 30/02 709/200 |
| 2002/0023034 A1* | 2/2002 | Brown | ................... | G06Q 40/04 705/36 R |
| 2002/0099693 A1* | 7/2002 | Kofsky | ................. | G06F 16/955 |
| 2004/0220903 A1* | 11/2004 | Shah | ..................... | G06F 16/955 |
| 2012/0096019 A1* | 4/2012 | Manickam | ........ | H04L 29/12632 707/767 |
| 2013/0254179 A1* | 9/2013 | Tan | ....................... | G06F 16/951 707/706 |
| 2014/0351283 A1* | 11/2014 | Cote | .................. | G06F 16/9537 707/770 |
| 2017/0337647 A1* | 11/2017 | Vaynshteyn | ........... | G06Q 50/18 |
| 2018/0268038 A1* | 9/2018 | Keyngnaert | ......... | G06Q 10/063 |
| 2019/0068551 A1* | 2/2019 | Bilsten | ................ | H04L 61/3025 |
| 2019/0236109 A1* | 8/2019 | Bryant, III | .......... | G06F 16/9538 |

OTHER PUBLICATIONS

USPTO, "Trademark process", 2014-2020, United State Patent and Trademark Office, pp. 1-6 (Year: 2014).*

* cited by examiner

*Primary Examiner* — Alexander Khong
(74) *Attorney, Agent, or Firm* — Cooper Legal Group, LLC

(57) ABSTRACT

One or more computing devices, systems, and/or methods for collectively performing a domain search and a trademark search are presented. For example, a graphical user interface may be controlled to display a domain search interface. A search request to search for domain names may be received via the domain search interface, wherein the search request comprises a name and a selection of a first selectable input corresponding to performing a trademark search. Responsive to receiving the search request, a domain database may be analyzed to generate a plurality of domain names associated with the name and/or a trademark database may be analyzed to generate a plurality of trademark names associated with the name. A search report may be generated comprising the plurality of domain names and the plurality of trademark names. The graphical user interface may be controlled to display the domain search interface comprising the search report.

20 Claims, 11 Drawing Sheets

COLLECTIVELY PERFORMING DOMAIN SEARCHES AND TRADEMARK SEARCHES

BACKGROUND

Many services, such as websites, applications, etc. may provide search platforms for searching for domains. For example, a user may use such a service to perform a search for domain names in an effort to implement a website for a product, a business, a non-profit entity, an organization, etc. However, the search for domain names may return search results having domain names similar to trademarks that are registered, and thus should not be used as a brand associated with a business that the user wants to create, for example. However, the user may choose a domain name from the search results that is similar to a registered trademark, and the user may choose a brand for the business based upon the domain name that violates the registered trademark.

SUMMARY

In accordance with the present disclosure, one or more computing devices and/or methods are provided. In an example, a graphical user interface of a client device may be controlled to display a domain search interface. The domain search interface may comprise an input field corresponding to a name and a first selectable input corresponding to performing a trademark search. A search request to search for domain names may be received via the domain search interface. The search request comprises the name and a selection of the first selectable input. Responsive to receiving the search request, a domain database may be analyzed to generate a plurality of domain names associated with the name and a trademark database may be analyzed to generate a plurality of trademark names associated with the name. A search report, comprising the plurality of domain names and the plurality of trademark names, may be generated. The graphical user interface may be controlled to display the domain search interface comprising the search report.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
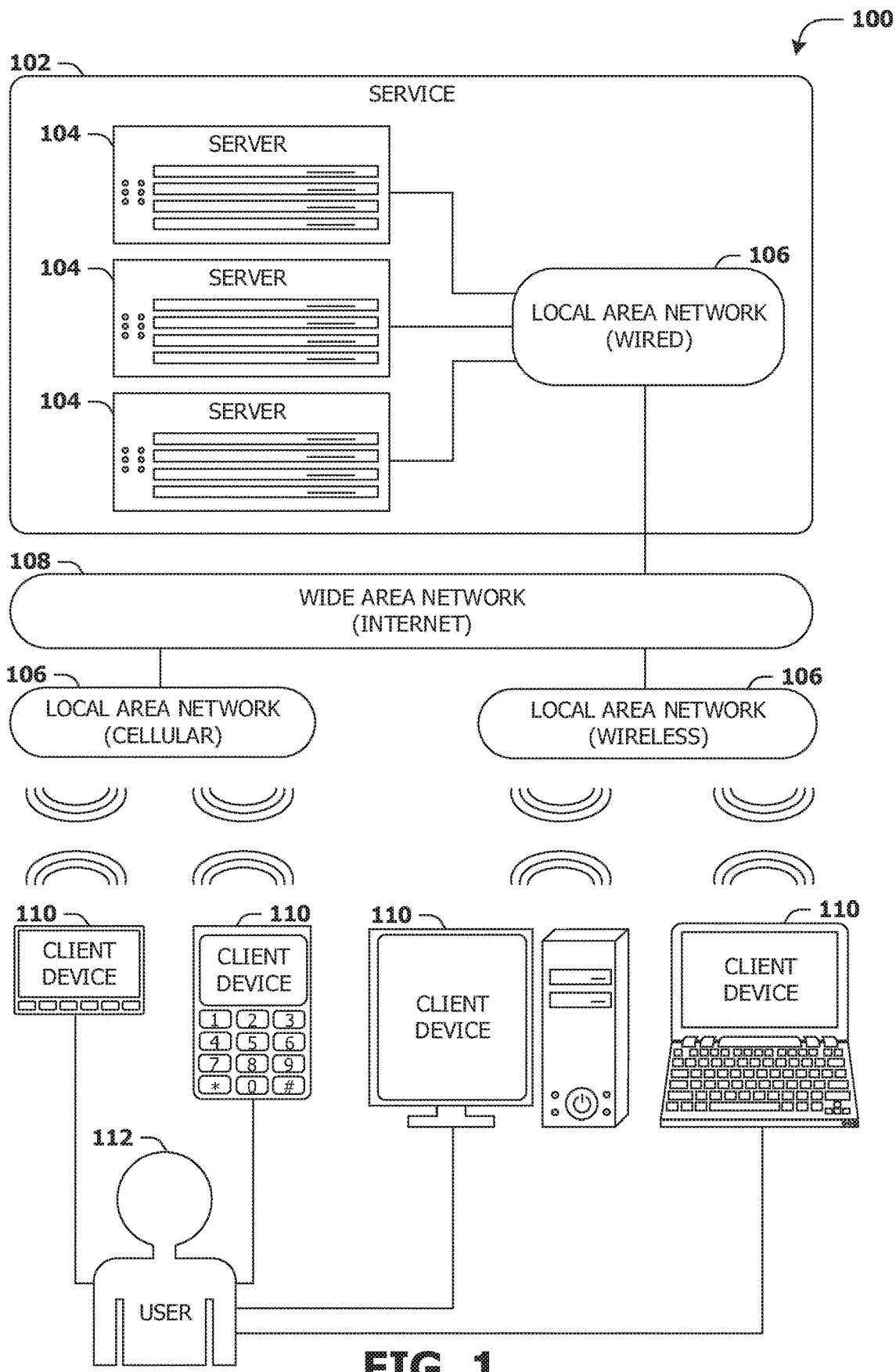
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
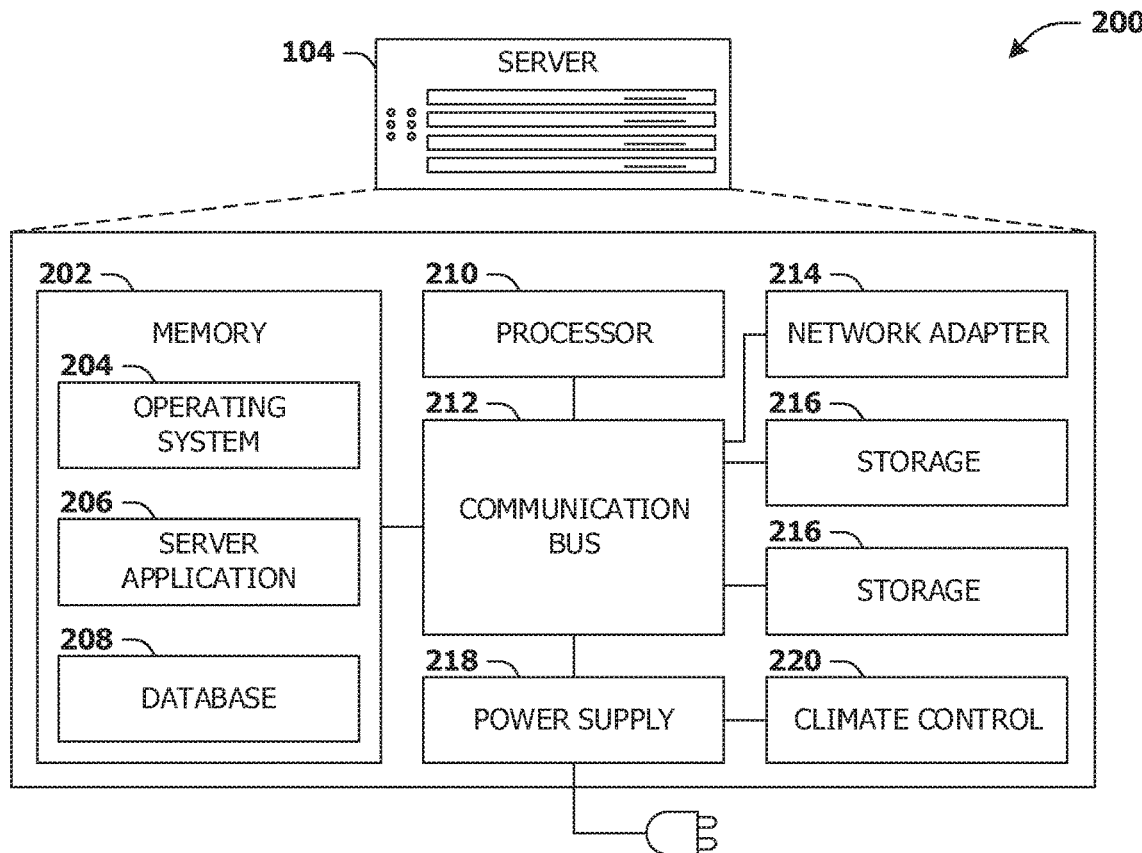
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
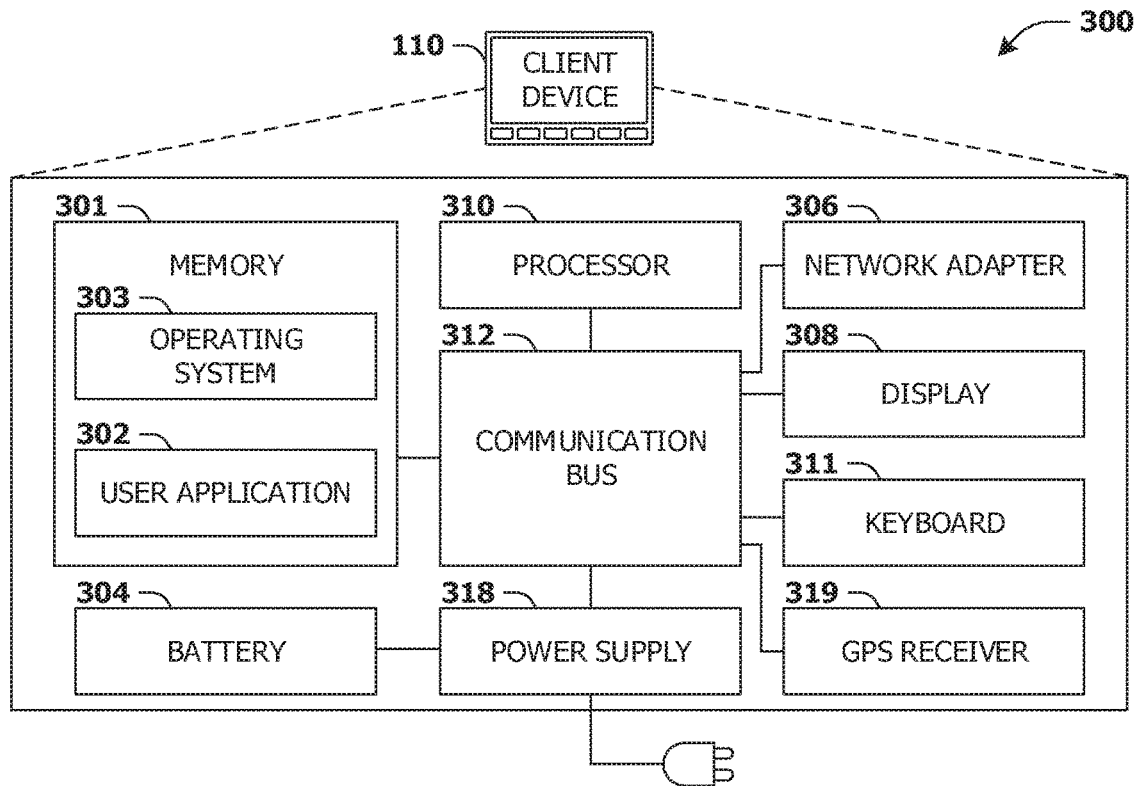
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices, systems, and/or techniques for collectively (and/or concurrently, jointly, etc.) performing a domain search and a trademark search are presented. For example, a user (and/or a device) may access and/or interact with a service, such as a website, an application, etc. that provides a platform for performing searches for domain names. The user may perform a search for domain names in an effort to implement a website for a product, a business, a non-profit entity, an organization, etc., for example. However, the search for domain names may return search results that may comprise domain names similar to trademarks that are registered, and thus should not be used as a name of the product, the business, the non-profit entity, the organization, etc. However, the user may choose a domain name from the search results that is similar to a registered trademark. The user may (inadvertently) choose a brand for the product, the business, the non-profit entity, the organization, etc. based upon the domain name that violates the registered trademark. Thus, in accordance with one or more of the techniques presented herein, a second service for performing searches for domain names may provide an option for performing a search for trademark names collectively (and/or concurrently, jointly, etc.) with a search for domain names. The user may perform a second search for domain names associated with a name. The second search for domain names may return search results comprising a plurality of domain names associated with the name and/or a plurality of trademark names associated with the name. Accordingly, the user may be able to choose a second domain name of the plurality of domain names and/or the user may be able determine options for a brand (e.g., a brand name) of the product, the business, the non-profit entity, the organization, etc., that may not violate registered trademarks, based upon the plurality of trademark names.

Figure 4:
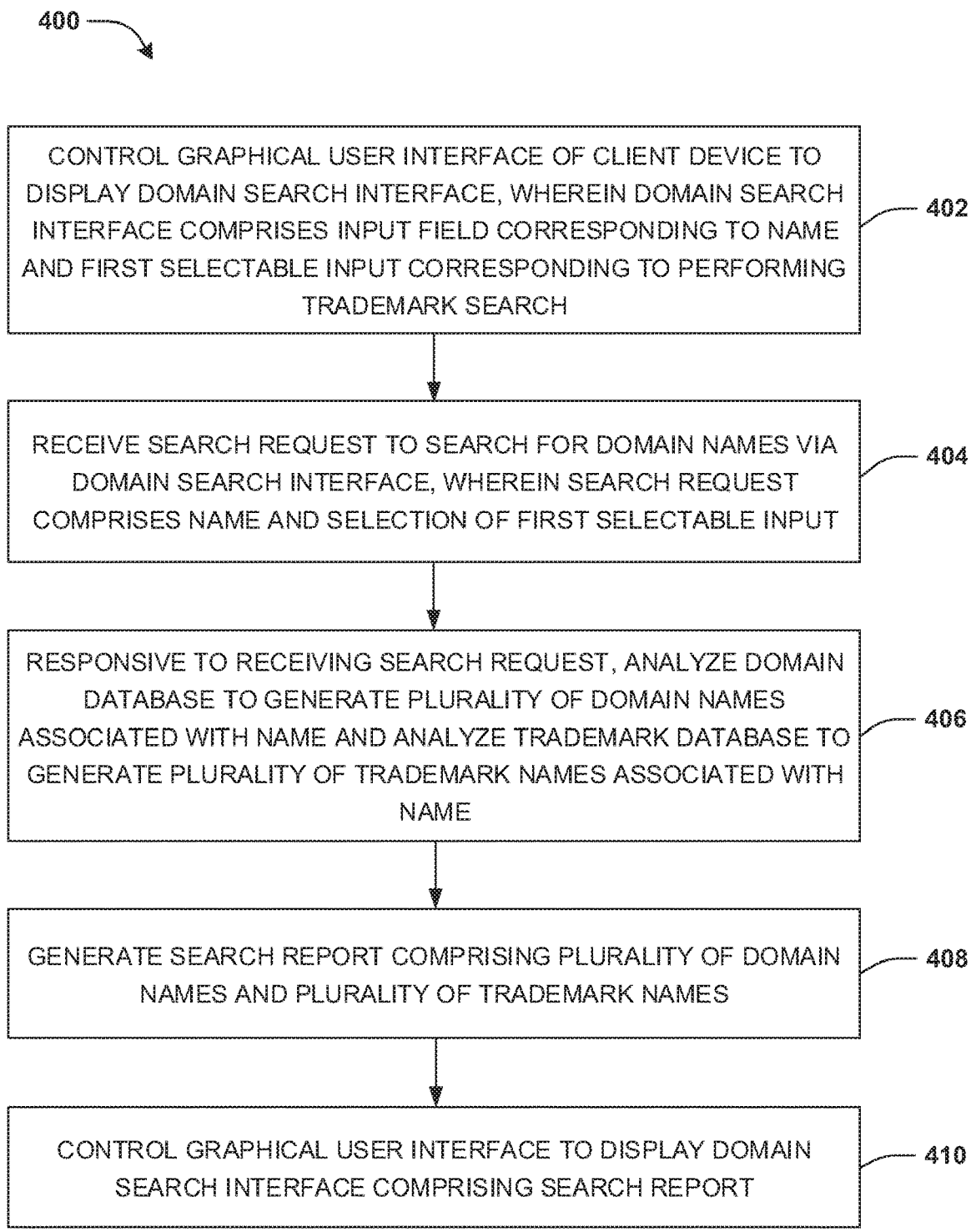
FIG. 4 is a flow chart illustrating an example method for collectively performing a domain search and a trademark search.

An embodiment of collectively (and/or concurrently, jointly, etc.) performing a domain search and a trademark search is illustrated by an example method 400 of FIG. 4. A user, such as user Jill, (and/or a device associated with the user) may access and/or interact with a service, such as a website, an application, etc. that provides a platform for performing searches for domain names. Alternatively and/or additionally, the service may provide for performing searches for trademark names collectively (and/or concurrently, jointly, etc.) with the searches for domain names.

At 402, a graphical user interface of the device may be controlled to display a domain search interface. The domain search interface may comprise an input field, corresponding to a name, and/or a first selectable input corresponding to performing a trademark search. The domain search interface may be associated with the service for performing searches for domain names.

In some examples, the name may be entered into the input field using a touchscreen (of the device), one or more switches (e.g., one or more buttons, a keyboard, etc.), a conversational interface (e.g., a voice recognition and natural language interface), etc. The name may comprise a combination of letters and/or symbols, a word, a group of words, a phrase, etc. The name may be used to search for domain names and/or trademark names that are associated with the name. For example, the name may be used to search for domain names and/or trademark names that match and/or approximately match an order of the combination of letters and/or symbols (e.g., a spelling) of the name. Alternatively and/or additionally, the name may be used to search for domain names and/or trademark names that have definitions and/or meanings similar to the name. Alternatively and/or additionally, the name may be used to search for domain names and/or trademark names that are phonetically similar to the name.

In some examples, the first selectable input may be selected using the touchscreen, the one or more switches, the conversational interface, etc. The first selectable input may correspond to performing the trademark search collectively with the domain search, based upon the name. In some examples, the first selectable input may comprise a checkbox. Alternatively and/or additionally, the domain search interface may comprise a second selectable input corresponding to generating and/or transmitting a search request. For example, responsive to a selection of the first selectable input (e.g., the checkbox) and a selection of the second selectable input (e.g., wherein the second selectable input may be selected after the selection of the first selectable input), the search request may be generated and/or transmitted to one or more servers associated with the service (e.g., and the domain search and the trademark search may be performed collectively and/or concurrently, jointly, etc.). Alternatively and/or additionally, responsive to a selection of the first selectable input, the search request may be generated and/or transmitted to the one or more servers (e.g., and the domain search and the trademark search may be performed collectively and/or concurrently, jointly, etc.).

At 404, the search request to search for domain names may be received (from the device) via the domain search interface. The search request may comprise the name and/or a selection of the first selectable input. In some examples, the search request may be received by the one or more servers (associated with the service). In some examples, the one or more servers may perform the domain search and/or the trademark search responsive to receiving the search request.

Accordingly, at 406, responsive to receiving the search request, a domain database may be analyzed to generate a plurality of domain names associated with the name and/or a trademark database may be analyzed to generate a plurality of trademark names associated with the name.

In some examples, the domain database may comprise a data structure (e.g., a list) corresponding to a second plurality of domain names. The data structure may comprise the second plurality of domain names and/or a plurality of sets of information, wherein each set of information of the plurality of sets of information may correspond to a domain name of the second plurality of domain names. For example, a set of information of the plurality of sets of information may comprise a domain availability status of a domain name (e.g., whether the domain name is registered by an entity, whether the domain name is reserved by an entity, etc.) and/or an expiration date (e.g., an expiration of a registration of the domain name, an expiration of a reservation of the domain name, etc.).

In some examples, the plurality of domain names may be generated based upon a determination that the plurality of domain names are available for purchase and/or that the plurality of domain names are not (currently) registered and/or reserved. For example, the analyzing the domain database to generate the plurality of domain names may comprise determining that each domain name of the plurality of domain names is available for purchase from a domain service and/or available to be registered by an entity. Alternatively and/or additionally, the plurality of domain names may comprise a third plurality of domain names that are not available for purchase from the domain service and/or are (currently) registered and/or reserved. In some examples, the domain service may be a part of the service. Alternatively and/or additionally, the domain service may be a different entity than the service.

In some examples, the trademark database may comprise a second data structure (e.g., a second list) corresponding to a plurality of registered trademarks. The second data structure may comprise a plurality of registered trademarks and/or a second plurality of sets of information, wherein each set of information of the second plurality of sets of information may correspond to a registered trademark of the plurality of registered trademarks. For example, a set of information of the second plurality of sets of information may comprise a trademark name of a registered trademark (e.g., a combination of words and/or symbols associated with the registered trademark, a brand associated with the registered trademark, etc.), a type of product and/or service that the registered trademark is associated with, a design mark (e.g., a graphical object, a logo, etc.) associated with the registered trademark, and/or a status of the registered trademark (e.g., times of use of the registered trademark, time of registration of the registered trademark, whether the registered trademark has been abandoned, etc.).

In some examples, the plurality of trademark names may be generated based upon a determination that the plurality of trademark names are not registered in the trademark database and/or are available to be registered. For example, the analyzing the trademark database to generate the plurality of trademark names may comprise determining that each trademark name of the plurality of trademark names is not registered in the trademark database and/or is available to be registered (in the trademark database) and/or used as a brand (e.g., a brand name, a mark, etc.) for a product and/or a service. Alternatively and/or additionally, the plurality of trademark names may comprise a second plurality of trademark names that are registered in the trademark database and/or are not available to be registered and/or used as a brand. In some examples, the trademark database is associated with a trademarks office (e.g., a trademarks registry) associated with a jurisdiction. In some examples, a plurality of trademark databases associated with a plurality of jurisdictions may be analyzed. Alternatively and/or additionally, the trademark database and/or the jurisdiction may be selected based upon one or more locations associated with the device (and/or the user).

In some examples, a selection of a third selectable input may be received (from the device) via the domain search interface. For example, the search request may comprise the selection of the third selectable input. The third selectable input may correspond to a category associated with the search request. For example, the category may be a type of website, a subject of content, a type of product, a type of service, etc. associated with the search request. Accordingly, the plurality of domain names may be generated based upon the category and/or the plurality of trademark names may be generated based upon the category. For example, the domain database may be analyzed based upon the category and/or the trademark database may be analyzed based upon the category.

In an example, the name (comprised within the search request) may comprise "relaxingcompany" and/or the category may comprise "lifestyle". The domain database may be analyzed (based upon the name and/or the category) to generate the plurality of domain names comprising a first domain name "relaxingcompany.com", a second domain name "relaxingcompany.style" and/or a third domain name "relaxing.co". Alternatively and/or additionally, the trademark database may be analyzed (based upon the name and/or the category) to generate the plurality of trademark names comprising a first trademark name "Relaxing Company", a second trademark name "Relaxing Co" and/or a third trademark name "Relaxing Service".

In some examples, the trademark database may be analyzed based upon domain names of the plurality of domain names to generate the plurality of trademark names having a plurality of sets of trademark names. For example, each set of trademark names of the plurality of sets of trademark names may be associated with a domain name of the plurality of domain names. For example, the trademark database may be analyzed based upon the first domain name to generate a first set of trademark names of the plurality of trademark names, comprising a fourth trademark name "RelaxingCompany.com" and/or a fifth trademark name "Relaxing Company". Alternatively and/or additionally, the trademark database may be analyzed based upon the second domain name to generate a second set of trademark names of the plurality of trademark names, comprising a sixth trademark name "relaxingcompany.style". Alternatively and/or additionally, the trademark database may be analyzed based upon the third domain name to generate a third set of trademark names of the plurality of trademark names, comprising a seventh trademark name "Relaxing Co" and/or an eighth trademark name "relaxing.co".

Alternatively and/or additionally, the domain database may be analyzed based upon trademark names of the plurality of trademark names to generate the plurality of domain names having a plurality of sets of domain names. For example, each set of domain names of the plurality of sets of domain names may be associated with a trademark name of the plurality of trademark names. For example, the domain database may be analyzed based upon the first trademark name to generate a first set of domain names of the plurality of domain names, comprising a fourth domain name "relaxing.company" and/or a fifth domain name "relaxingcompany.co". Alternatively and/or additionally, the domain database may be analyzed based upon the second trademark name to generate a second set of domain names of the plurality of domain names, comprising a sixth domain name "relaxingco.com" and/or a seventh domain name "relaxingco.net". Alternatively and/or additionally, the domain database may be analyzed based upon the third trademark name to generate a third set of domain names of the plurality of domain names, comprising an eighth domain name "relaxingservice.com" and/or a ninth domain name "relaxing.service.co".

At 408, a search report may be generated. The search report may comprise the plurality of domain names and/or the plurality of trademark names. At 410, the graphical user interface (of the device) may be controlled to display the domain search interface comprising the search report. In some examples, the search report may be generated having a first format. For example, the search report (having the first format) may comprise a search report list. The search report list may be generated (by the one or more servers) based upon the plurality of domain names and/or the plurality of trademark names. For example, the search report list may comprise the plurality of domain names and/or the plurality of trademark names.

In some examples, the search report list may be generated having the plurality of domain names separate from the plurality of trademark names. For example, the plurality of domain names may be comprised within a first section of the search report list and/or the plurality of trademark names may be comprised within a second section of the search report list (separate from the first section of the search report list). Alternatively and/or additionally, the plurality of domain names (and/or the first section of the search report list) may be organized, sorted and/or displayed in an order determined based upon levels of association of the plurality of domain names with the name (comprised within the search request). The levels of association of the plurality of domain names may be determined based upon levels of similarity of spellings of the plurality of domain names to the order of the combination of letters and/or symbols (e.g., the spelling) of the name, levels of similarity of definitions and/or meanings of the plurality of domain names to the name, levels of similarity of pronunciations (and/or phonetics) of the plurality of domain names to the name, levels of popularity of top-level domains of the plurality of domain names, levels of similarity of the top-level domains to the name and/or to the category, etc.

For example, the first domain name may have a first level of association with the name. The second domain name may have a second level of association with the name. The first level of association may be higher than the second level of association. Accordingly, the first domain name may be positioned above (e.g., before, in front of, etc.) the second domain name in the search report list (and/or in the first section of the search report list). Alternatively and/or additionally, the plurality of domain names (and/or the first section of the search report list) may be organized and/or sorted alphabetically, based upon categories, etc.

Alternatively and/or additionally, the plurality of trademark names (and/or the second section of the search report list) may be organized, sorted and/or displayed in an order determined based upon levels of association of the plurality of trademark names with the name. The levels of association of the plurality of trademark names may be determined based upon levels of similarity of spellings of the plurality of trademark names to the order of the combination of letters and/or symbols (e.g., the spelling) of the name, levels of similarity of definitions and/or meanings of the plurality of trademark names to the name, levels of similarity of pronunciations (and/or phonetics) of the plurality of trademark names to the name, etc.

For example, the first trademark name may have a third level of association with the name. The second trademark name may have a fourth level of association with the name. The third level of association may be higher than the fourth level of association. Accordingly, the first trademark name may be positioned above (e.g., before, in front of, etc.) the second trademark name in the search report list (and/or in the second section of the search report list). Alternatively and/or additionally, the plurality of trademark names (and/or the second section of the search report list) may be organized and/or sorted alphabetically, based upon categories, etc.

Alternatively and/or additionally, the plurality of domain names may not be separate from the plurality of trademark names in the search report list. For example, the plurality of domain names and the plurality of trademark names may be organized, sorted and/or displayed in an order determined based upon the levels of association of the plurality of domain names with the name and the levels of association of the plurality of trademark names with the name.

Alternatively and/or additionally, the search report may be generated having a second format corresponding to a version of the search report organized based upon the plurality of domain names. For example, the search report (having the second format) may comprise a first plurality of sections. Each section of the first plurality of sections may comprise a domain name of the plurality of domain names and/or a set of trademark names (of the plurality of sets of trademark names) associated with the domain name.

For example, a third section of the first plurality of sections may comprise the first domain name and/or the first set of trademark names. Alternatively and/or additionally, a fourth section of the first plurality of sections may comprise the second domain name and/or the second set of trademark names. Alternatively and/or additionally, a fifth section of the first plurality of sections may comprise the third domain name and/or the third set of trademark names.

Alternatively and/or additionally, the search report may be generated having a third format corresponding to a version of the search report organized based upon the plurality of trademark names. For example, the search report (having the third format) may comprise a second plurality of sections. Each section of the second plurality of sections may comprise a trademark name of the plurality of trademark names and/or a set of domain names (of the plurality of sets of domain names) associated with the trademark name.

For example, a sixth section of the second plurality of sections may comprise the first trademark name and/or the first set of domain names. Alternatively and/or additionally, a seventh section of the second plurality of sections may comprise the second trademark name and/or the second set of domain names. Alternatively and/or additionally, an eighth section of the second plurality of sections may comprise the third trademark name and/or the third set of domain names.

In some examples, the search report and/or the domain search interface may comprise a fourth selectable input corresponding to the search report having the first format. In some examples, the fourth selectable input may be selected using the touchscreen, the one or more switches, the conversational interface, etc. In some examples, responsive to a selection of the fourth selectable input, a first version of the search report may be generated having the first format.

In some examples, the search report and/or the domain search interface may comprise a fifth selectable input corresponding to the search report having the second format. In some examples, the fifth selectable input may be selected using the touchscreen, the one or more switches, the conversational interface, etc. In some examples, responsive to a selection of the fifth selectable input, a second version of the search report may be generated having the second format.

In some examples, the search report and/or the domain search interface may comprise a sixth selectable input corresponding to the search report having the third format. In some examples, the sixth selectable input may be selected using the touchscreen, the one or more switches, the conversational interface, etc. In some examples, responsive to a selection of the sixth selectable input, a third version of the search report may be generated having the third format.

In some examples, the plurality of domain names may comprise the third plurality of domain names that are not available for purchase from the domain service and/or are (currently) registered and/or reserved. The search report may comprise one or more first indications that the third plurality of domain names are not available for purchase from the domain service and/or are (currently) registered and/or reserved. For example, the search report may comprise a first plurality of indications that the third plurality of domain names are not available for purchase from the domain service and/or are (currently) registered and/or reserved. For example, each indication of the first plurality of indications may be adjacent to a domain name of the third plurality of domain names and/or may indicate that the domain name is not available for purchase from the domain service and/or that the domain name is (currently) registered and/or reserved. Alternatively and/or additionally, the search report may comprise a ninth section comprising the third plurality of domain names and/or a first indication that the third plurality of domain names (within the ninth section) are not available for purchase from the domain service and/or are (currently) registered and/or reserved.

In some examples, the search report and/or the domain search interface may comprise a seventh selectable input corresponding to the plurality of domain names comprising the third plurality of domain names that are not available for purchase from the domain service and/or are (currently) registered and/or reserved. For example, responsive to a selection of the seventh selectable input, the plurality of domain names may comprise (e.g., may be generated comprising) the third plurality of domain names. Alternatively and/or additionally, the search report and/or the domain search interface may comprise an eighth selectable input corresponding to the plurality of domain names without the third plurality of domain names. For example, responsive to a selection of the eighth selectable input, the plurality of domain names may be generated based upon a determination that the plurality of domain names are available for purchase and/or that the plurality of domain names are not (currently) registered and/or reserved.

Alternatively and/or additionally, the plurality of trademark names may comprise the second plurality of trademark names that are registered in the trademark database and/or are not available to be registered and/or used as a brand. The search report may comprise one or more second indications that the second plurality of trademark names are registered in the trademark database and/or are not available to be registered and/or used as a brand. For example, the search report may comprise a second plurality of indications that the second plurality of trademark names are registered in the trademark database and/or are not available to be registered and/or used as a brand. For example, each indication of the second plurality of indications may be adjacent to a trademark name of the second plurality of trademark names and/or may indicate that the trademark name is registered in the trademark database and/or is not available to be registered and/or used as a brand. Alternatively and/or additionally, the search report may comprise a tenth section comprising the second plurality of trademark names and/or a second indication that the second plurality of trademark names (within the tenth section) are registered in the trademark database and/or are not available to be registered and/or used as a brand.

In some examples, the search report and/or the domain search interface may comprise a ninth selectable input corresponding to the plurality of trademark names comprising the second plurality of trademark names that are registered in the trademark database and/or are not available to be registered and/or used as a brand. For example, responsive to a selection of the ninth selectable input, the plurality of trademark names may comprise (e.g., may be generated comprising) the second plurality of trademark names. Alternatively and/or additionally, the search report and/or the domain search interface may comprise a tenth selectable input corresponding to the plurality of trademark names without the second plurality of trademark names. For example, responsive to a selection of the tenth selectable input, the plurality of trademark names may be generated based upon a determination that the plurality of trademark names are not registered in the trademark database and/or are available to be registered and/or used as a brand.

In some examples, the search report may comprise service opportunities associated with the plurality of trademark names and/or the plurality of domain names. The service opportunities may comprise indications of (and/or links to web pages associated with) promotional services and/or products associated with the plurality of trademark names and/or the plurality of domain names. For example, the service opportunities may comprise indications of services and/or products for designing logos, indications of services and/or products for designing (and/or maintaining) websites (and/or applications), indications of services and/or products for designing and/or printing business cards, indications of services and/or products for designing (and/or producing) clothing (e.g., promotional t-shirts, promotional sweaters, promotional hats, etc.), indications of services and/or products for designing (and/or producing) kitchenware (e.g., promotional cups, promotional utensils, etc.), indications of services and/or products for designing (and/or producing) stationery and/or office supplies (e.g., letter-heads for businesses, promotional pens, promotional pencils, etc.), etc. The service opportunities may comprise selectable inputs (e.g., selectable graphical objects), graphical objects, links to web pages, messages, etc.

In some examples, the service opportunities may be generated based upon the category. In a first example, the category may comprise "Sports". In the first example, the service opportunities may comprise indications of services and/or products for designing (and/or producing) sports-related products (e.g., promotional soccer balls, promotional footballs, promotional jerseys, etc.). In a second example, the category may comprise "Information technology". In the second example, the service opportunities may comprise indications of services and/or products for designing (and/or producing) information technology-related products (e.g., promotional USB drives, promotional battery chargers, etc.).

For example, a plurality of sets of service opportunities may be generated. For example, each set of service opportunities may be associated with a domain name of the plurality of domain names and/or a trademark name of the plurality of trademark names. For example, the search report (having the second format) may comprise the plurality of sets of service opportunities, wherein each set of service opportunities of the plurality of sets of service opportunities may be associated with a domain name of the plurality of domain names and/or may be comprised within a section (corresponding to the domain name) of the first plurality of sections. Alternatively and/or additionally, the search report (having the third format) may comprise the plurality of sets of service opportunities, wherein each set of service opportunities of the plurality of sets of service opportunities may be associated with a trademark name of the plurality of trademark names and/or may be comprised within a section (corresponding to the trademark name) of the second plurality of sections.

In some examples, the search report and/or the domain search interface may comprise a first plurality of selectable inputs corresponding to purchasing domain names from the domain service. For example, each selectable input of the first plurality of selectable inputs may be associated with a domain name of the plurality of domain names and/or may be displayed adjacent to the domain name. Alternatively and/or additionally, the search report and/or the domain search interface may comprise a second plurality of selectable inputs corresponding to registering trademark names. For example, each selectable input of the second plurality of selectable inputs may be associated with a trademark name of the plurality of trademarks names and/or may be displayed adjacent to the trademark name.

In some examples, a second request to purchase a tenth domain name (from the domain service) may be received (via the domain search interface and/or the search report). For example, the second request may be received via a selection of an eleventh selectable input of the first plurality of selectable inputs, corresponding to purchasing the tenth domain name. In some examples, responsive to receiving the second request, the graphical user interface may be controlled to display a purchasing interface comprising selectable inputs and/or input fields associated with payment details. For example, a transaction associated with purchasing (and/or registering) the tenth domain name may be facilitated via the purchasing interface.

In some examples, responsive to receiving the second request and/or responsive to (completion of) the transaction, the trademark database may be analyzed to generate a fourth set of trademark names based upon the tenth domain name. Alternatively and/or additionally, responsive to receiving the second request and/or responsive to (completion of) the transaction, the fourth set of trademark names, associated with the tenth domain name, may be selected from the plurality of trademark names. In some examples, the graphical user interface may be controlled to display the fourth set of trademark names (e.g., the fourth set of trademark names may be displayed within the domain search interface).

In some examples, a first set of selectable inputs, corresponding to the fourth set of trademark names, may be generated and/or displayed (within the domain search interface). For example, each selectable input of the first set of selectable inputs may correspond to registering a trademark name of the fourth set of trademark names. In some examples, each selectable input of the first set of selectable inputs may be displayed adjacent to a trademark name of the fourth set of trademark names. Alternatively and/or additionally, the graphical user interface may be controlled to display a second input field (e.g., the second input field may be displayed within the domain search interface). In some examples, the second input field may correspond to a user-defined trademark name. Alternatively and/or additionally, the graphical user interface may be controlled to display a selectable input corresponding to registering two or more of the fourth set of trademark names, or starting the process of registering the two or more of the fourth set of trademark names in order to determine which trademark names of the fourth set of trademark names are available.

In some examples, a selection of a twelfth selectable input of the first set of selectable inputs may be received, corresponding to a ninth trademark name. Alternatively and/or additionally, the ninth trademark name may be entered into the second input field using the touchscreen, the one or more switches, the conversational interface, etc. Alternatively and/or additionally, a selection of the selectable input corresponding to registering two or more of the fourth set of trademark names may be received. For example, responsive to the selection of the twelfth selectable input, the ninth trademark name being entered into the second input field, and/or the selection of the selectable input corresponding to registering two or more of the fourth set of trademark names, a first legal representative may be selected from a legal representative database based upon the ninth trademark name, the two or more of the fourth set of trademark names, the category, the device and/or the user.

In some examples, the legal representative database may be comprised within the one or more servers and/or the legal representative database may be accessed via a network connection (by the one or more servers). For example, the legal representative database may comprise a data structure (e.g., a list) comprising a plurality of legal representatives and/or a third plurality of sets of information. Each set of information of the third plurality of sets of information may comprise indications of services that a legal representative provides, indications of one or more locations of the legal representative, areas of law that the legal representative is associated with, company information associated with the legal representative, consumer reviews and/or ratings associated with the legal representative, etc. In some examples, the plurality of legal representatives may comprise law firms, law consultants, companies that perform legal matters, companies that provide trademark services, etc.

In some examples, the first legal representative may be selected for registering the ninth trademark name based upon a comparison of a first set of information (comprised within the legal representative database) corresponding to the first legal representative with user information associated with the device (and/or the user). For example, the first legal representative may be selected based upon demographic parameters associated with the device, behavior and/or settings associated with the device, etc. For example, the demographic parameters may comprise a location of the device and/or the user, an age associated with the user, income levels associated with the user, etc. Alternatively and/or additionally, the category may be compared with the first set of information to determine whether services that the first legal representative provides and/or areas of law that the first legal representative practices matches the category.

Alternatively and/or additionally, a list of legal representatives may be displayed (via the domain search interface) comprising a second plurality of legal representatives and/or the plurality of legal representatives. Accordingly, the first legal representative may be selected responsive to (receiving) a selection of the first legal representative form the list of legal representatives.

In some examples, responsive to the selection of the first legal representative, a third request to register the ninth trademark name (or whichever trademark name(s) were selected for registration) may be transmitted to one or more second servers associated with the first legal representative. In some examples, the third request may be transmitted by the device (associated with the user). Alternatively and/or additionally, the third request may be transmitted by the one or more servers (associated with the service).

In some examples, the one or more servers and/or the device may receive one or more notifications from the first legal representative. For example, the one or more notifications may comprise indications of a status of the registering the ninth trademark name (or whichever trademark name(s) were selected for registration). For example, the one or more notifications may indicate that the ninth trademark name and/or the trademark database (e.g., and/or other sources of information) are being reviewed to determine whether the ninth trademark name may be registered in the trademark database, that a review of the ninth trademark name has been completed and that it is determined that the ninth trademark name cannot be registered, that a review of the ninth trademark name has been completed and that it is determined that the ninth trademark name can be registered, that an application to register the ninth trademark name has been filed, that the ninth trademark name was rejected and/or was not registered, that the ninth trademark name was approved and/or registered, etc. In some examples, where two or more trademark names were selected for registration, the one or more notifications may indicate information about the statuses of the two or more trademark names.

For example, a first notification may be received from the first legal representative comprising an indication of a status of the registering the ninth trademark name. Responsive to receiving the first notification, a second notification, comprising an indication of the status, may be generated. The second notification may be transmitted to the device and/or a second device associated with the user. For example, a fourth request to access a user account (of the service) associated with the user may be received from the device and/or the second device. Responsive to receiving the fourth request, the graphical user interface of the device and/or a second graphical user interface of the second device may be controlled to display the second notification. Alternatively and/or additionally, the second notification may be transmitted to an email account associated with the user. Alternatively and/or additionally, the second notification may be transmitted via text messaging, instant messaging, social media, etc. to the device and/or the second device.

In some examples, a fifth request to register a tenth trademark name may be received (via the domain search interface and/or the search report). For example, the fifth request may be received via a selection of a thirteenth selectable input corresponding to the tenth trademark name. Responsive to the selection of the thirteenth selectable input, a second legal representative may be selected from the legal representative database based upon the tenth trademark name, the category, the device and/or the user. Responsive to the selection of the second legal representative, a sixth request to register the tenth trademark name may be transmitted to one or more third servers associated with the second legal representative.

In some examples, in response to receiving selection of a single selectable input in the domain search interface, a request to purchase one or more domains associated with the single selectable input and register one or more trademarks associated with the single selectable input may be generated and executed.

FIGS. 5A-5G illustrate examples of a system 501 for collectively (and/or concurrently, jointly, etc.) performing a domain search and a trademark search. A user, such as user Jake (and/or a device 500 associated with the user) may access and/or interact with a service, such as a website, an application, etc. that provides a platform for performing searches for domain names. Alternatively and/or additionally, the service may provide for performing searches for trademark names collectively (and/or concurrently, jointly, etc.) with the searches for domain names.

Figure 5A:
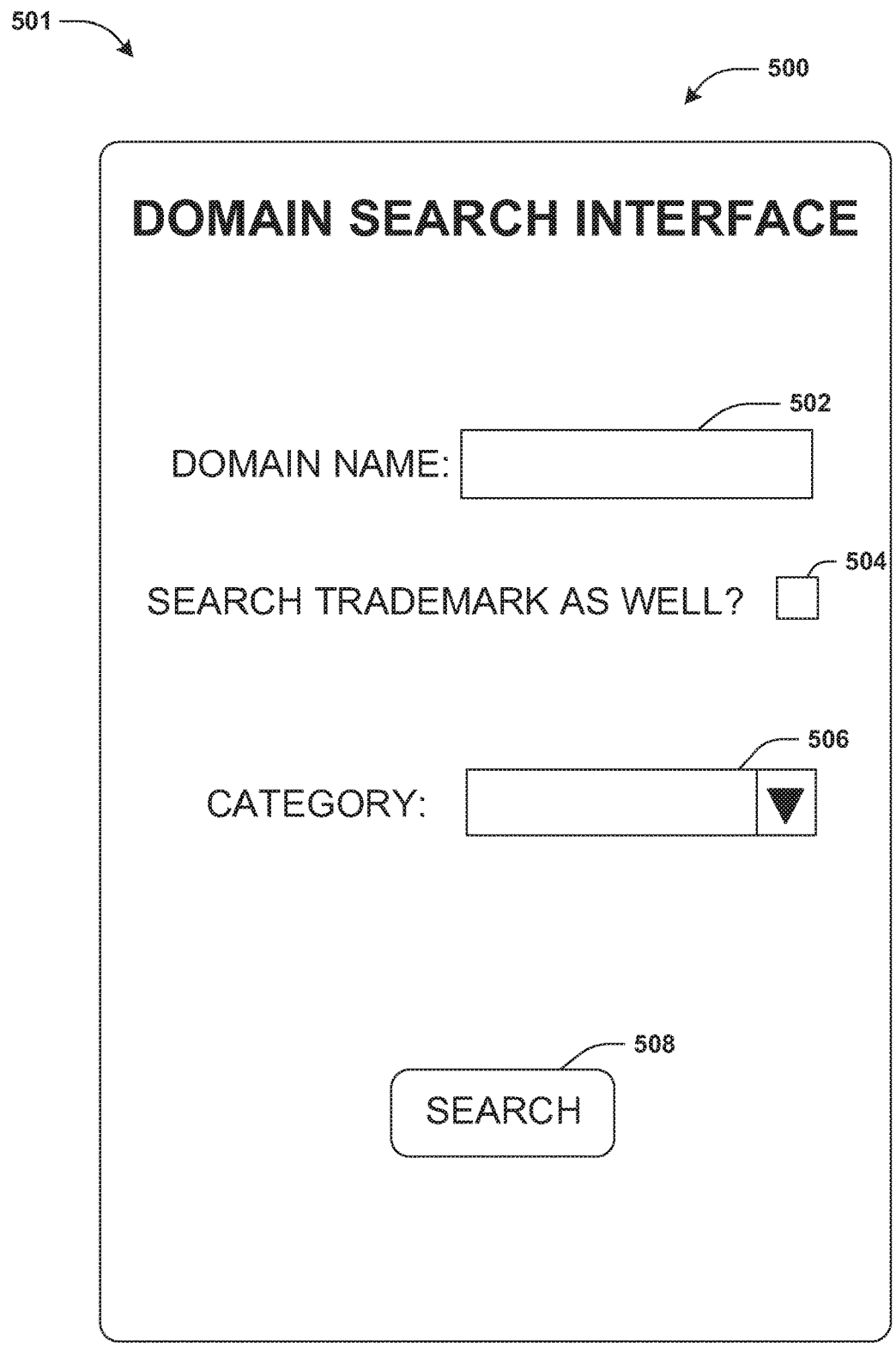
FIG. 5A is a component block diagram illustrating an example system for collectively performing a domain search and a trademark search, where a graphical user interface of a device is controlled to display a domain search interface.

FIG. 5A illustrates a graphical user interface of the device 500 being controlled to display a domain search interface. The domain search interface may comprise a first input field 502, corresponding to a name (e.g., a combination of letters and/or symbols, a word, a group of words, a phrase, etc.) that may be used to search for domain names and/or trademark names associated with the name. For example, the name may be entered into the first input field 502 using a touchscreen (of the device 500), one or more switches (e.g., one or more buttons, a keyboard, etc.), a conversational interface (e.g., a voice recognition and natural language interface), etc.

Alternatively and/or additionally, the domain search interface may comprise a first selectable input 504 corresponding to performing a trademark search. In some examples, the first selectable input 504 may comprise a checkbox. For example, responsive to a selection of the first selectable input 504, an indication (e.g., a check mark, a greyed out area, a circle, etc.) that the first selectable input 504 was selected may be displayed within and/or adjacent to the first selectable input 504. In some examples, the first selectable input 504 may be selected using the touchscreen, the one or more switches, the conversational interface, etc.

Alternatively and/or additionally, the domain search interface may comprise a second selectable input 506 corresponding to a category that may be used to search for domain names and/or trademark names associated with the category. The second selectable input 506 may comprise a second input field. For example, the category may be entered into the second input field using the touchscreen, the one or more switches, the conversational interface, etc. Alternatively and/or additionally, the second selectable input 506 may comprise a first drop-down menu. For example, responsive to a selection of the second selectable input 506, a first menu may be displayed comprising a plurality of categories. For example, the category may be selected from the first menu using the touchscreen, the one or more switches, the conversational interface, etc.

Alternatively and/or additionally, the domain search interface may comprise a third selectable input 508 corresponding performing a domain search and/or a trademark search. For example, the third selectable input 508 may be selected using the touchscreen, the one or more switches, the conversational interface, etc. In some examples, responsive to a selection of the third selectable input 508, a search request may be generated and/or transmitted to one or more servers associated with the service. The search request may comprise the name, the selection of the first selectable input 504 and/or the category.

In some examples, responsive to (the one or more servers) receiving the search request, a domain database may be analyzed to generate a plurality of domain names associated with the name and/or the category. Alternatively and/or additionally, a trademark database may be analyzed to generate a plurality of trademark names associated with the name and/or the category. In some examples, a search report may be generated. The search report may comprise the plurality of domain names and/or the plurality of trademark names.

Figure 5B:
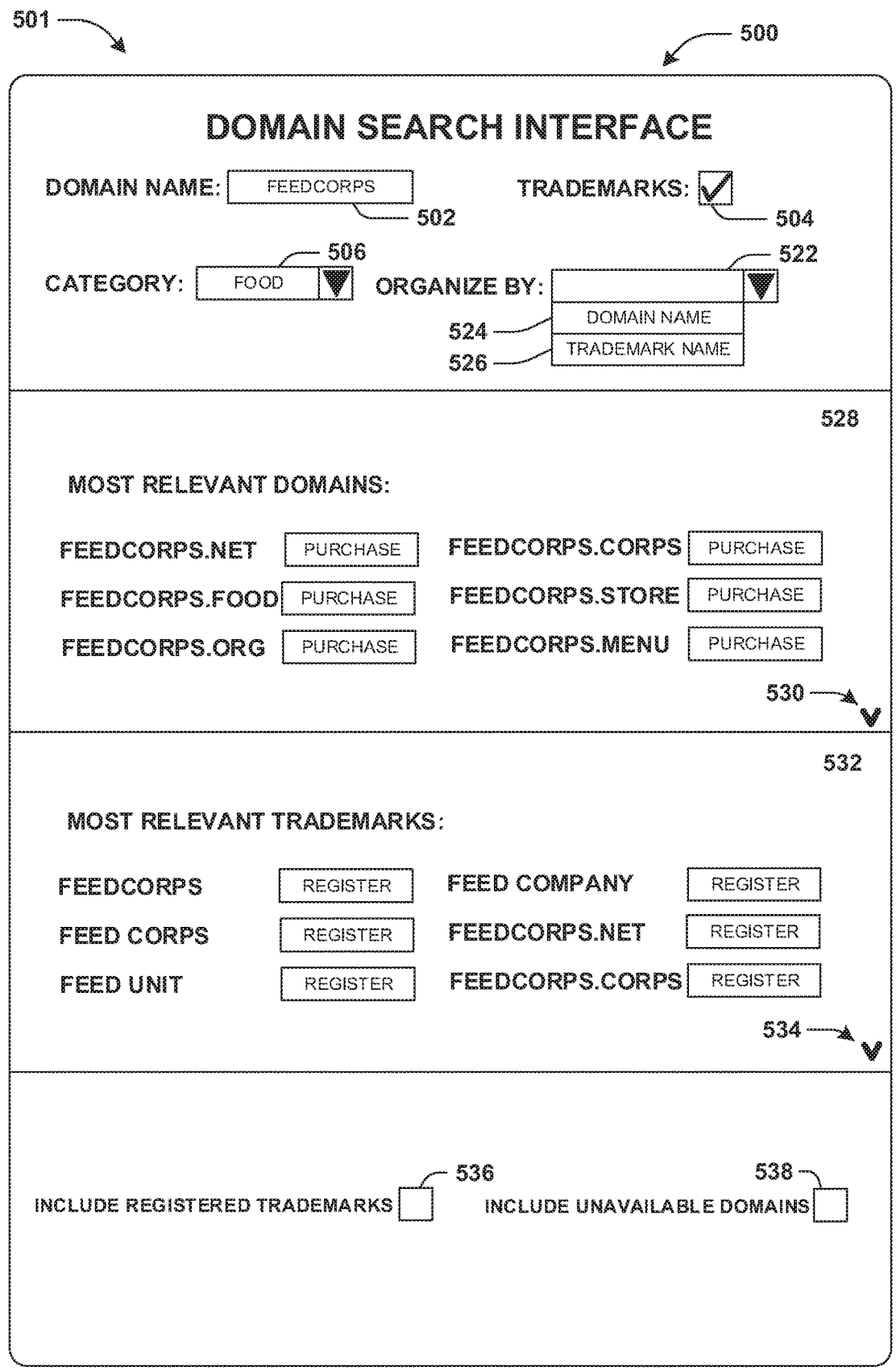
FIG. 5B is a component block diagram illustrating an example system for collectively performing a domain search and a trademark search, where a graphical user interface of a device is controlled to display a first version of a search report.

FIG. 5B illustrates the graphical user interface of the device 500 being controlled to display a first version of the search report having a first format. For example, the search report may comprise a search report list. The search report list may be generated based upon the plurality of domain names and/or the plurality of trademark names. For example, the search report list may comprise the plurality of domain names and/or the plurality of trademark names.

The search report list may be generated having the plurality of domain names separate from the plurality of trademark names. For example, the plurality of domain names may be comprised within a first section 528 of the search report list and/or the plurality of trademark names may be comprised within a second section 532 of the search report list. In some examples, (merely) a first portion of the first section 528 may be displayed. In some examples, the first section 528 may comprise a fourth selectable input 530 corresponding to displaying a second portion of the first section 528. For example, responsive to a selection of the fourth selectable input 530, the second portion of the first section 528 may be displayed. Alternatively and/or additionally, (merely) a first portion of the second section 532 may be displayed. In some examples, the second section 532 may comprise a fifth selectable input 534 corresponding to displaying a second portion of the second section 532. For example, responsive a selection of the fifth selectable input 534, the second portion of the second section 532 may be displayed.

In some examples, the domain search interface may comprise a sixth selectable input 536 corresponding to the plurality of trademark names comprising a second plurality of trademark names that are registered in the trademark database and/or are not available to be registered and/or used as a brand. In some examples, the sixth selectable input 536 may comprise a checkbox. For example, responsive to a selection of the sixth selectable input 536, an indication (e.g., a check mark, a greyed out area, a circle, etc.) that the sixth selectable input 536 was selected may be displayed within and/or adjacent to the sixth selectable input 536.

Alternatively and/or additionally, the domain search interface may comprise a seventh selectable input 538 corresponding to the plurality of domain names comprising a second plurality of domain names that are not available for purchase from a domain service and/or are (currently) registered and/or reserved. In some examples, the seventh selectable input 538 may comprise a checkbox. For example, responsive to a selection of the seventh selectable input 538, an indication (e.g., a check mark, a greyed out area, a circle, etc.) that the seventh selectable input 538 was selected may be displayed within and/or adjacent to the seventh selectable input 538.

In some examples, the domain search interface may comprise an eighth selectable input 522 corresponding to a format of the search report. The eighth selectable input 522 may comprise a second drop down menu. For example, responsive to a selection of the eighth selectable input 522, a second menu may be displayed comprising a plurality of formats. For example, the second menu may comprise a ninth selectable input 524 corresponding to a second format and/or a tenth selectable input 526 corresponding to a third format. In some examples, the second format may correspond to a version of the search report organized based upon the plurality of domain names. Alternatively and/or additionally, the third format may correspond to a version of the search report organized based upon the plurality of trademark names. For example, the tenth selectable input 526 may be selected from the second menu using the touchscreen, the one or more switches, the conversational interface, etc. Responsive to the selection of the tenth selectable input 526, a second version of the search report may be generated having the third format.

Figure 5C:
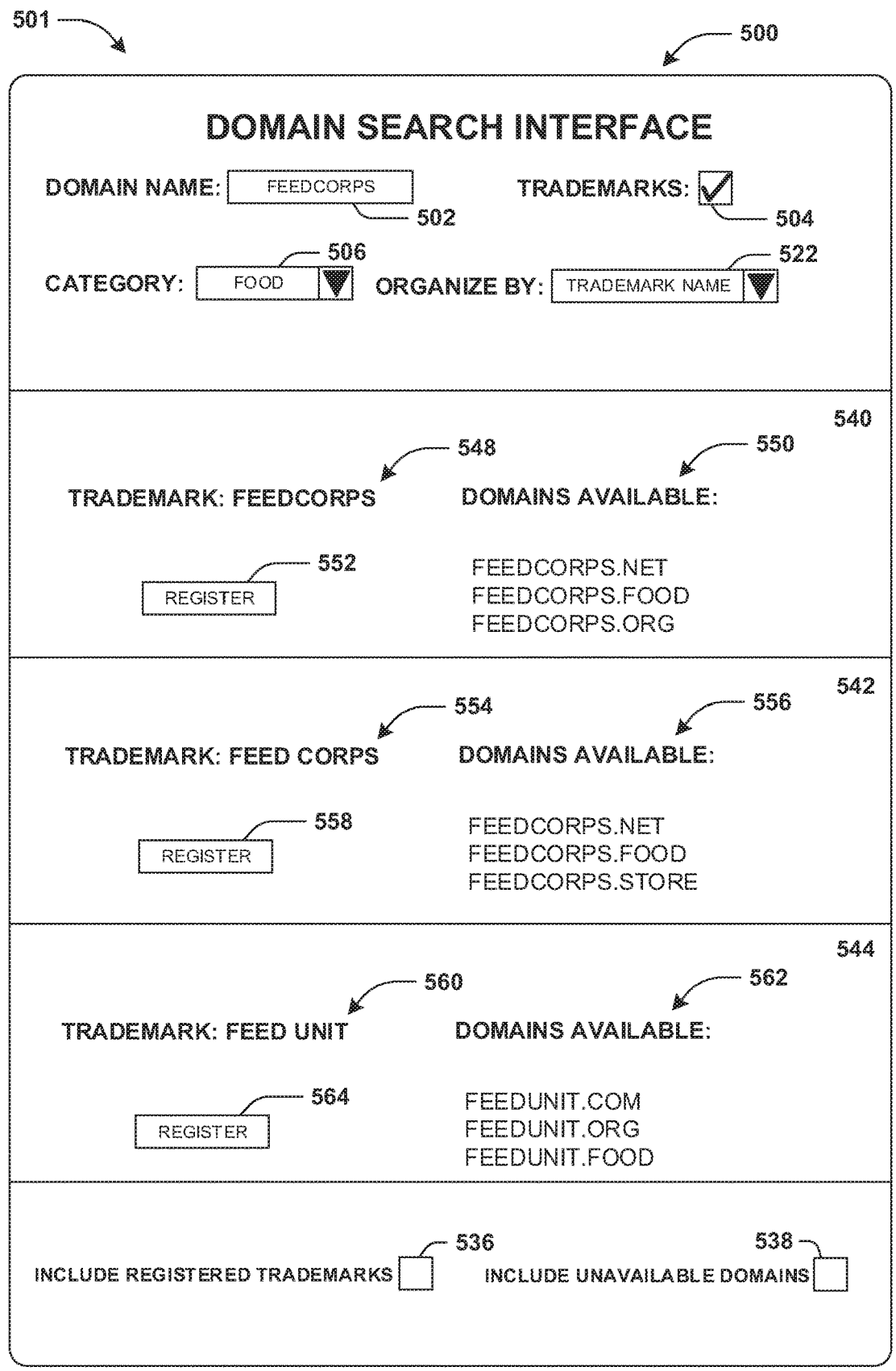
FIG. 5C is a component block diagram illustrating an example system for collectively performing a domain search and a trademark search, where a graphical user interface of a device is controlled to display a second version of a search report.

FIG. 5C illustrates the graphical user interface of the device 500 being controlled to display the second version of the search report having the third format. For example, the search report may comprise a first plurality of sections. Each section of the first plurality of sections may comprise a trademark name of the plurality of trademark names and/or a set of domain names, of the plurality of domain names, associated with the trademark name.

For example, the search report may comprise a third section 540 comprising a first trademark name 548 and/or a first set of domain names 550 associated with the first trademark name 548. In some examples, the third section 540 may comprise an eleventh selectable input 552 corresponding to registering the first trademark name 548 (in the trademark database). Alternatively and/or additionally, the search report may comprise a fourth section 542 comprising a second trademark name 554 and/or a second set of domain names 556 associated with the second trademark name 554. In some examples, the fourth section 542 may comprise a twelfth selectable input 558 corresponding to registering the second trademark name 554. Alternatively and/or additionally, the search report may comprise a fifth section 544 comprising a third trademark name 560 and/or a third set of domain names 562 associated with the third trademark name 560. In some examples, the fifth section 544 may comprise a thirteenth selectable input 564 corresponding to registering the third trademark name 560.

In an example, the ninth selectable input 524 (corresponding to the second format of the search report) may be selected (via the eighth selectable input 522) from the second menu using the touchscreen, the one or more switches, the conversational interface, etc. Responsive to the selection of the ninth selectable input 524, a third version of the search report may be generated having the second format.

Figure 5D:
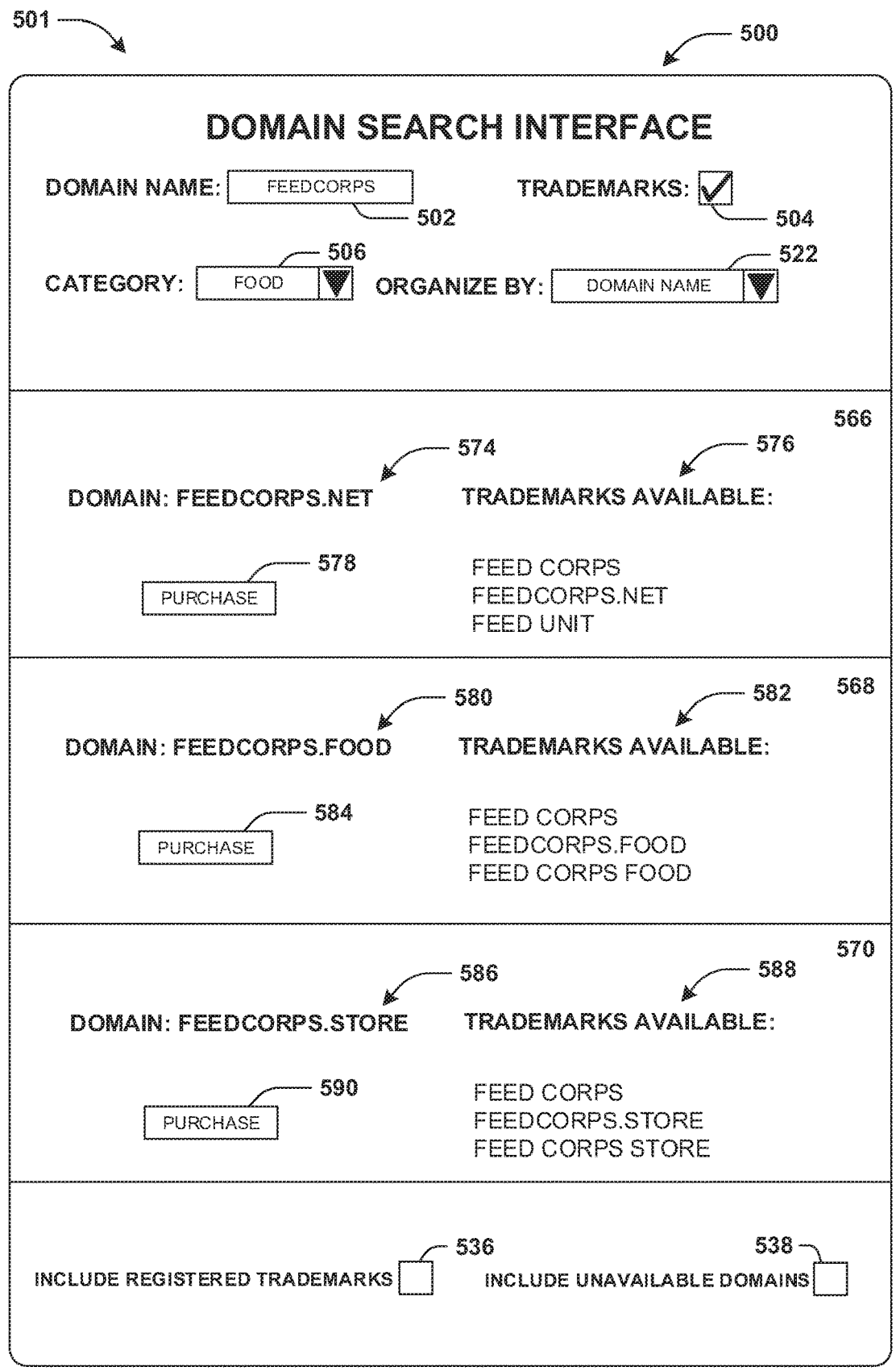
FIG. 5D is a component block diagram illustrating an example system for collectively performing a domain search and a trademark search, where a graphical user interface of a device is controlled to display a third version of a search report.

FIG. 5D illustrates the graphical user interface of the device 500 being controlled to display the third version of the search report having the second format. For example, the search report may comprise a second plurality of sections. Each section of the second plurality of sections may comprise a domain name of the plurality of domain names and/or a set of trademark names, of the plurality of trademark names, associated with the domain name.

For example, the search report may comprise a sixth section 566 comprising a first domain name 574 and/or a first set of trademark names 576 associated with the first domain name 574. In some examples, the sixth section 566 may comprise a fourteenth selectable input 578 corresponding to purchasing the first domain name 574 (from the domain service). Alternatively and/or additionally, the search report may comprise a seventh section 568 comprising a second domain name 580 and/or a second set of trademark names 582 associated with the second domain name 580. In some examples, the seventh section 568 may comprise a fifteenth selectable input 584 corresponding to purchasing the second domain name 580. Alternatively and/or additionally, the search report may comprise an eighth section 570 comprising a third domain name 586 and/or a third set of trademark names 588 associated with the third domain name 586. In some examples, the eighth section 570 may comprise a sixteenth selectable input 590 corresponding to purchasing the third domain name 586.

In some examples, the fourteenth selectable input 578 (associated with a second request to purchase the first domain name 574) may be selected using the touchscreen, the one or more switches, the conversational interface, etc. Responsive to the selection of the fourteenth selectable input 578, the graphical user interface of the device 500 may be controlled to display a purchasing interface comprising selectable inputs and/or input fields associated with payment details. For example, a transaction associated with purchasing (and/or registering) the first domain name 574 may be facilitated via the purchasing interface.

Figure 5E:
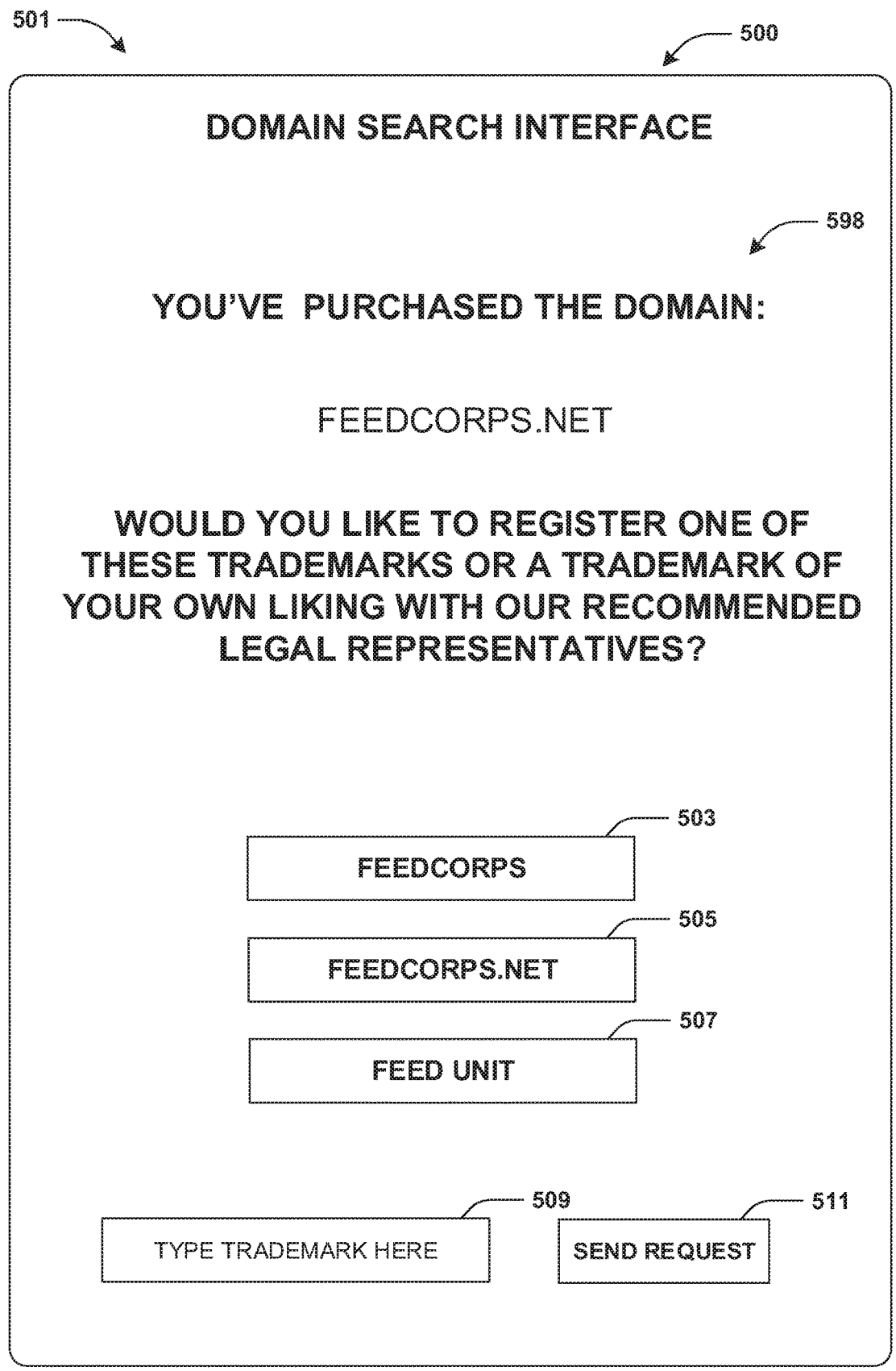
FIG. 5E is a component block diagram illustrating an example system for collectively performing a domain search and a trademark search, where a graphical user interface of a device is controlled to display selectable inputs corresponding to a first set of trademark names.

FIG. 5E illustrates the graphical user interface of the device 500 being controlled to display selectable inputs corresponding to the first set of trademark names 576 (associated with the first domain name 574). For example, a first set of instructions 598 may be displayed (within the domain search interface). In some examples, responsive to the selection of the fourteenth selectable input 578 and/or responsive to (completion) of the transaction, the graphical user interface of the device 500 may be controlled to display the selectable inputs corresponding to the first set of trademark names 576 and/or the first set of instructions 598. The domain search interface may comprise a seventeenth selectable input 503 corresponding to registering a fourth trademark name of the first set of trademark names 576. Alternatively and/or additionally, the domain search interface may comprise an eighteenth selectable input 505 corresponding to registering a fifth trademark name of the first set of trademark names 576. Alternatively and/or additionally, the domain search interface may comprise a nineteenth selectable input 507 corresponding to registering a sixth trademark name of the first set of trademark names 576. Alternatively and/or additionally, the domain search interface may comprise a third input field 509, corresponding to a user-defined trademark name, and/or a twentieth selectable input 511 corresponding to registering the user-defined trademark name.

In some examples, the seventeenth selectable input 503 (corresponding to registering the fourth trademark name) may be selected using the touchscreen, the one or more switches, the conversational interface, etc. In some examples, responsive to the selection of the seventeenth selectable input 503, a legal representative may be selected from a legal representative database based upon the fourth trademark name, the category, the device 500 and/or the user.

Figure 5F:
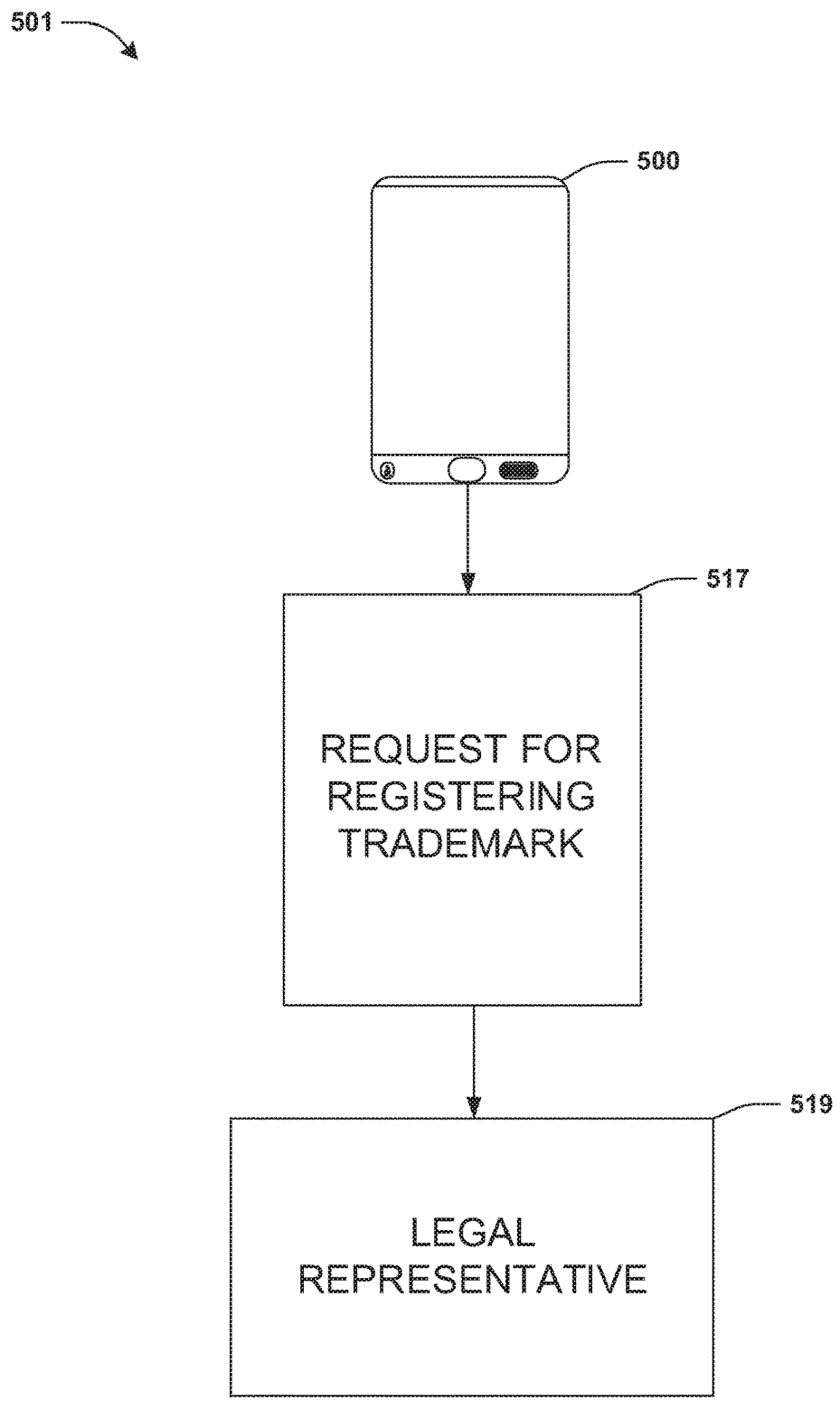
FIG. 5F is a component block diagram illustrating an example system for collectively performing a domain search and a trademark search, where a third request to register a fourth trademark name is transmitted to one or more second servers associated with a legal representative.

FIG. 5F illustrates the device 500 transmitting a third request 517 to register the fourth trademark name, to one or more second servers 519 associated with the legal representative. For example, the third request 517 may be transmitted (by the device 500) to the one or more second servers 519 responsive to the selection of the legal representative. Alternatively and/or additionally, the third request 517 may be transmitted to the one or more second servers 519 by the one or more servers (associated with the service).

Figure 5G:
FIG. 5G is a component block diagram illustrating an example system for collectively performing a domain search and a trademark search, where a graphical user interface of a device is controlled to display a domain search interface comprising service opportunities associated with a first domain name and/or a fourth trademark name.

FIG. 5G illustrates the graphical user interface of the device 500 being controlled to display the domain search interface comprising service opportunities associated with the first domain name 574 and/or the fourth trademark name. For example, the domain search interface may comprise a second set of instructions 533. The domain search interface may comprise a twenty-first selectable input 525 corresponding to services and/or products for designing logos, a twenty-second selectable input 527 corresponding to services and/or products for designing and/or producing clothing (e.g., promotional t-shirts), a twenty-third selectable input 529 corresponding to services and/or products for designing and/or producing kitchenware (e.g., promotional cups) and/or a twenty-fourth selectable input 531 corresponding to services and/or products for designing and/or producing business cards.

In some examples, the second set of instructions 533 and/or the service opportunities may be displayed via the graphical user interface responsive to the third request 517 being transmitted to the one or more second servers 519. Alternatively and/or additionally, the second set of instructions 533 and/or the service opportunities may be displayed via the graphical user interface responsive to completion of the registering the fourth trademark name (by the legal representative). Alternatively and/or additionally, the second set of instructions 533 and/or the service opportunities may be displayed via the graphical user interface responsive to the transaction (for purchasing the first domain name 574) being completed.

It may be appreciated that the disclosed subject matter may assist a user (and/or a device associated with the user) in collectively (and/or concurrently, jointly, etc.) performing a domain search and a trademark search. Alternatively and/or additionally, the disclosed subject matter may assist the user (and/or the device) in choosing a domain name and/or a brand (e.g., a brand name) (of a product, a business, a non-profit entity, an organization, etc.) without violating registered trademarks. Alternatively and/or additionally, the disclosed subject matter may assist the user (and/or the device) in registering a trademark name chosen from trademark search results. Alternatively and/or additionally, the disclosed subject matter may assist the user (and/or the device) in finding service opportunities (e.g., promotional services and/or products) associated with the domain name, the trademark name and/or the brand.

Implementation of at least some of the disclosed subject matter may lead to benefits including, but not limited to, a reduction in screen space and/or an improved usability of a display (e.g., of the device) (e.g., as a result of enabling the device to perform a search for domain names associated with a name and a search for trademark names associated with the name (collectively), wherein the device may display a plurality of domain names and a plurality of trademarks (concurrently), wherein a separate application and/or a separate window may not need to be opened in order to search for the plurality of trademarks associated with the name, etc.).

Alternatively and/or additionally, implementation of at least some of the disclosed subject matter may lead to benefits including, a reduction in screen space and/or an improved usability of the display (e.g., as a result of enabling the device to display service opportunities associated with the plurality of domain names and/or the plurality of trademark names, wherein the device may display the service opportunities, the plurality of domain names and/or the plurality of trademark names (concurrently), wherein a separate application and/or a separate window may not need to be opened in order to find service opportunities associated with the plurality of domain names and/or the plurality of trademark names, etc.).

Alternatively and/or additionally, implementation of at least some of the disclosed subject matter may lead to benefits including, a reduction in screen space and/or an improved usability of the display (e.g., as a result of enabling the device to display a list of legal representatives for registering a trademark name, as a result of enabling the device to select a legal representative for registering the trademark name and automatically transmitting a request to the legal representative to register the trademark name, wherein a separate application and/or a separate window may not need to be opened in order to find legal representatives to register the trademark name, etc.).

Alternatively and/or additionally, implementation of at least some of the disclosed subject matter may lead to benefits including a reduction in bandwidth (e.g., as a result of reducing a need for using separate internet services to perform trademark searches, find service opportunities and/or find legal representatives, etc.).

In some examples, at least some of the disclosed subject matter may be implemented on a device (e.g., a client device), and in some examples, at least some of the disclosed subject matter may be implemented on a server (e.g., hosting a service accessible via a network, such as the Internet).

Figure 6:
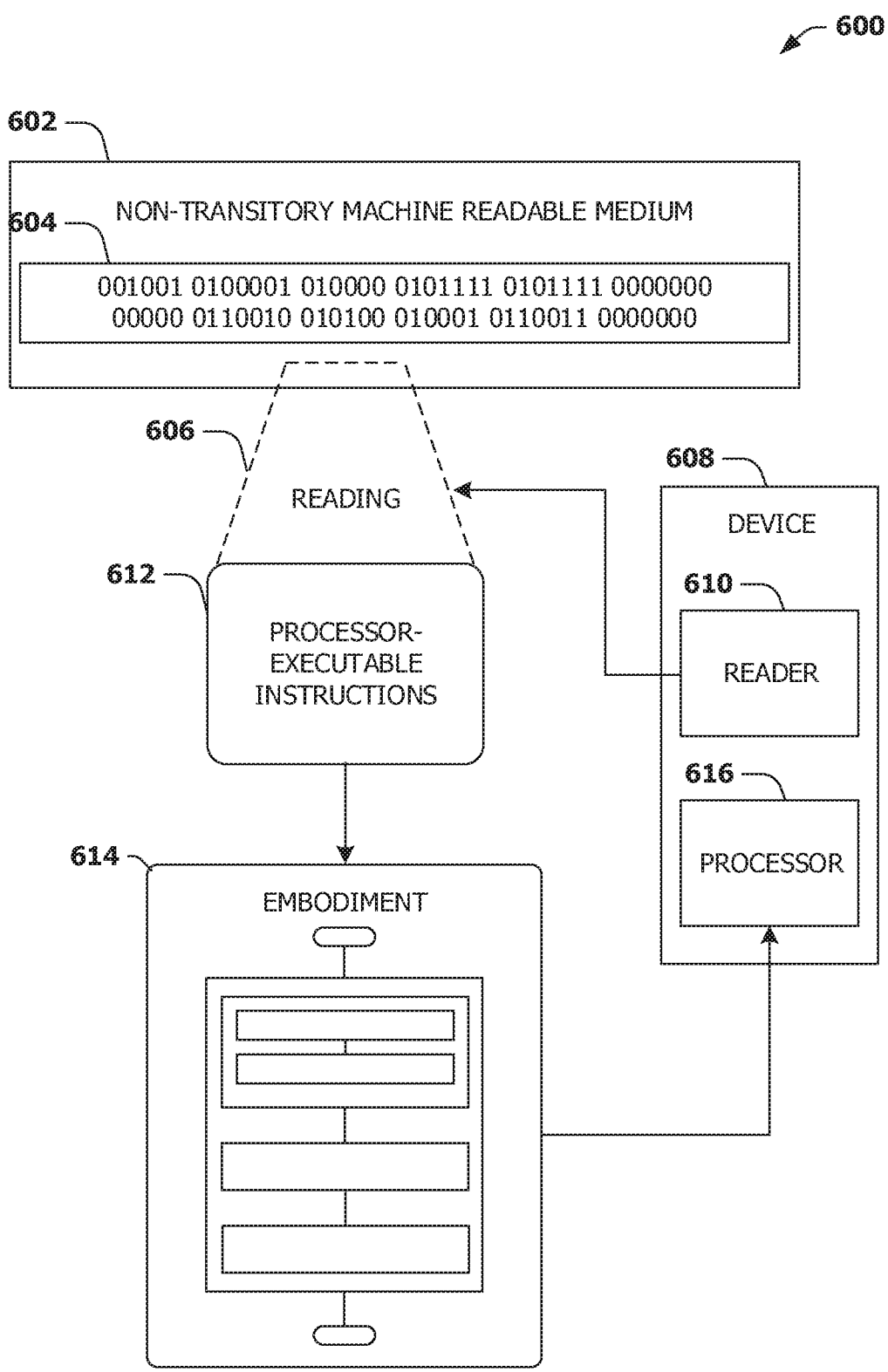
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   controlling a graphical user interface of a client device to display a domain search interface, wherein the domain search interface comprises an input field corresponding to a name and a first selectable input corresponding to performing a trademark search;
   receiving a search request to search for domain names via the domain search interface, wherein the search request comprises the name and a selection of the first selectable input;
   responsive to receiving the search request:
      analyzing a domain database to generate a plurality of domain names associated with the name; and
      analyzing a trademark database to generate a plurality of trademark names, comprising two or more trademark names available to be registered, associated with the name;
   generating a search report comprising the plurality of domain names and the plurality of trademark names comprising the two or more trademark names available to be registered,
   wherein:
      the search report comprises a plurality of sections; and
      each section of the plurality of sections comprises a first name and a set of second names associated with the first name; and
   controlling the graphical user interface to display the domain search interface comprising the search report.

2. The method of claim 1, wherein the analyzing the trademark database is performed based upon the plurality of domain names to identify a plurality of sets of trademark names, wherein:
   each set of trademark names of the plurality of sets of trademark names is associated with a domain name of the plurality of domain names;
   the first name is at least one of a domain name of the plurality of domain names or a trademark name of the plurality of sets of trademark names; and
   the set of second names is at least one of a set of domain names or a set of trademark names.

3. The method of claim 1, wherein the analyzing the domain database is performed based upon the plurality of trademark names to identify a plurality of sets of domain names, wherein:
   each set of domain names of the plurality of sets of domain names is associated with a trademark name of the plurality of trademark names;
   the search report comprises a plurality of sections; and
   each section of the plurality of sections comprises a trademark name of the plurality of trademark names and a set of domain names, of the plurality of sets of domain names, associated with the trademark name.

4. The method of claim 1, wherein the generating the search report comprises generating a list comprising the plurality of domain names and the plurality of trademark names, wherein the search report comprises the list.

5. The method of claim 1, wherein the plurality of domain names are generated based upon a determination that the plurality of domain names are available for purchase from a domain service.

6. The method of claim 1, wherein:
   the plurality of domain names comprises a second plurality of domain names that are not available for purchase from a domain service; and
   the search report comprises one or more indications that the second plurality of domain names are not available for purchase from the domain service.

7. The method of claim 1, wherein the plurality of trademark names are generated based upon a determination that the plurality of trademark names are not registered in the trademark database.

8. The method of claim 1, wherein:
   the plurality of trademark names comprises a second plurality of trademark names that are registered in the trademark database; and
   the search report comprises one or more indications that the second plurality of trademark names are registered in the trademark database.

9. The method of claim 1, comprising:
   receiving a request to purchase a domain name via the domain search interface;
   analyzing the trademark database to generate a second set of trademark names based upon the domain name; and controlling the graphical user interface to display one or more selectable inputs corresponding to the second set of trademark names.

10. The method of claim 9, comprising:
receiving a selection of a second selectable input, of the one or more selectable inputs, corresponding to a trademark name of the second set of trademark names;
responsive to receiving the selection of the second selectable input, selecting a legal representative from a legal representative database based upon at least one of the trademark name, the client device or a user associated with the client device; and
transmitting a request to register the trademark name to a second client device associated with the legal representative.

11. The method of claim 10, comprising:
receiving a first notification from the second client device, wherein the first notification comprises an indication of a status of the registering the trademark name;
responsive to receiving the first notification, generating a second notification comprising an indication of the status;
receiving a request to access a user account associated with the client device from a third client device; and
responsive to receiving the request to access the user account associated with the client device, controlling a graphical user interface of the third client device to display the second notification.

12. The method of claim 11, wherein the client device is the same as the third client device.

13. The method of claim 11, wherein the client device is different than the third client device.

14. The method of claim 1, comprising:
receiving a request to register a trademark name via the domain search interface;
responsive to receiving the request to register the trademark name, selecting a legal representative from a legal representative database based upon at least one of the trademark name, the client device or a user associated with the client device; and
transmitting a request to register the trademark name to a second client device associated with the legal representative.

15. The method of claim 1, wherein the generating the search report comprises generating a plurality of sets of service opportunities, wherein:
each set of service opportunities of the plurality of sets of service opportunities comprises promotional services associated with at least one of a domain name of the plurality of domain names or a trademark name of the plurality of trademark names; and
the search report comprises the plurality of sets of service opportunities.

16. The method of claim 1, wherein:
the search request comprises a selection of a third selectable input corresponding to a category associated with the search request;
the generating the plurality of domain names is performed based upon the category; and
the generating the plurality of trademark names is performed based upon the category.

17. The method of claim 16, wherein the generating the search report comprises generating a plurality of sets of service opportunities based upon the category, wherein:
each set of service opportunities of the plurality of sets of service opportunities comprises promotional services associated with at least one of a domain name of the plurality of domain names or a trademark name of the plurality of trademark names; and
the search report comprises the plurality of sets of service opportunities.

18. A computing device comprising:
a processor; and
memory comprising processor-executable instructions that when executed by the processor cause performance of operations, the operations comprising:
controlling a graphical user interface of a client device to display a domain search interface, wherein the domain search interface comprises an input field corresponding to a name and a first selectable input corresponding to performing a trademark search;
receiving a search request to search for domain names via the domain search interface, wherein the search request comprises the name and a selection of the first selectable input;
responsive to receiving the search request:
analyzing a domain database to generate a plurality of domain names associated with the name; and
analyzing a trademark database to generate a plurality of trademark names associated with the name, wherein the analyzing the trademark database is performed based upon the plurality of domain names to identify a plurality of sets of trademark names, wherein each set of trademark names of the plurality of sets of trademark names is associated with a domain name of the plurality of domain names;
generating a search report comprising the plurality of domain names and the plurality of trademark names, wherein:
the search report comprises a plurality of sections; and
each section of the plurality of sections comprises a domain name of the plurality of domain names and a set of trademark names, of the plurality of sets of trademark names, associated with the domain name; and
controlling the graphical user interface to display the domain search interface comprising the search report.

19. The computing device of claim 18, wherein the plurality of trademark names are generated based upon a determination that the plurality of trademark names are not registered in the trademark database.

20. A non-transitory machine readable medium having stored thereon processor-executable instructions that when executed cause performance of operations, the operations comprising:
controlling a graphical user interface of a client device to display a domain search interface, wherein the domain search interface comprises an input field corresponding to a name and a first selectable input corresponding to performing a trademark search;
receiving a search request to search for domain names via the domain search interface, wherein the search request comprises the name and a selection of the first selectable input;
responsive to receiving the search request:
analyzing a trademark database to generate a plurality of trademark names associated with the name; and
analyzing a domain database to generate a plurality of domain names associated with the name, wherein the analyzing the domain database is performed based upon the plurality of trademark names to identify a plurality of sets of domain names, wherein each set of domain names of the plurality of sets of domain names is associated with a trademark name of the plurality of trademark names;

generating a search report comprising the plurality of domain names and the plurality of trademark names, wherein:

the search report comprises a plurality of sections; and each section of the plurality of sections comprises a trademark name of the plurality of trademark names and a set of domain names, of the plurality of sets of domain names, associated with the trademark name; and controlling the graphical user interface to display the domain search interface comprising the search report.

* * * * *